United States Patent
Matsumoto et al.

(10) Patent No.: US 12,304,057 B2
(45) Date of Patent: May 20, 2025

(54) CONTROL SYSTEM

(71) Applicant: FANUC CORPORATION, Yamanashi (JP)

(72) Inventors: Takashi Matsumoto, Yamanashi (JP); Gou Inaba, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 262 days.

(21) Appl. No.: 17/926,861

(22) PCT Filed: Jun. 23, 2021

(86) PCT No.: PCT/JP2021/023760
§ 371 (c)(1),
(2) Date: Nov. 21, 2022

(87) PCT Pub. No.: WO2021/261513
PCT Pub. Date: Dec. 30, 2021

(65) Prior Publication Data
US 2023/0226700 A1  Jul. 20, 2023

(30) Foreign Application Priority Data
Jun. 25, 2020 (JP) .................. 2020-109581

(51) Int. Cl.
*B25J 13/02* (2006.01)
*G05B 19/4155* (2006.01)

(52) U.S. Cl.
CPC .......... *B25J 13/02* (2013.01); *G05B 19/4155* (2013.01); *G05B 2219/39439* (2013.01)

(58) Field of Classification Search
CPC ............... G05B 19/4155; G05B 2219/39439
See application file for complete search history.

(56) References Cited

U.S. PATENT DOCUMENTS

| 6,324,443 B1 | 11/2001 | Kurakake et al. |
| 2015/0352720 A1 | 12/2015 | Iizuka |

(Continued)

FOREIGN PATENT DOCUMENTS

| EP | 0940739 A2 | 9/1999 |
| EP | 1085389 A1 | 3/2001 |

(Continued)

OTHER PUBLICATIONS

Higuchi, Kotaro, International Search Report; PCT/JP2021/023760; Dated Aug. 12, 2021; 5 pages.

*Primary Examiner* — Wade Miles
*Assistant Examiner* — Jerrod Irvin Davis
(74) *Attorney, Agent, or Firm* — Renner, Otto, Boisselle & Sklar, LLP (57) ABSTRACT

A control system includes: a manual operating device that generates an operation signal in accordance with rotation of a dial by an operator; a machine tool controller and a robot controller that are connected in such a manner as to be communicable with each other and that control a machine tool and a robot, respectively, based on the operation signal; and an operational-target setting unit that sets an operational target for the manual operating device selectively between the machine tool and the robot. The manual operating device is connected to one of the controllers and inputs the operation signal to the one of the controllers. When the operational-target setting unit sets the operational target as a control target to be controlled by the other of the controllers, the one of the controllers transmits the operation signal or a signal based on the operation signal to the other of the controllers.

12 Claims, 7 Drawing Sheets

(56) References Cited

U.S. PATENT DOCUMENTS

| | | | |
|---|---|---|---|
| 2016/0062475 A1* | 3/2016 | Gombert | G06F 3/02 74/471 R |
| 2017/0028558 A1 | 2/2017 | Nishi et al. | |
| 2017/0123820 A1 | 5/2017 | Nishi et al. | |
| 2017/0308055 A1 | 10/2017 | Hoshino et al. | |
| 2018/0143614 A1 | 5/2018 | Aizawa et al. | |
| 2018/0143615 A1 | 5/2018 | Aizawa et al. | |
| 2018/0333846 A1* | 11/2018 | Tarui | B25J 11/005 |
| 2018/0333856 A1 | 11/2018 | Iizuka | |
| 2021/0078171 A1 | 3/2021 | Ozaki | |

FOREIGN PATENT DOCUMENTS

| | | | |
|---|---|---|---|
| EP | 2965874 A2 | | 1/2016 |
| EP | 3214514 A1 | | 9/2017 |
| JP | H11249725 A | | 9/1999 |
| JP | 2001154717 A | | 6/2001 |
| JP | 2003114706 A | * | 4/2003 |
| JP | 2010-277425 A | | 12/2010 |
| JP | 2013222381 A | | 10/2013 |
| JP | 2014-038540 A | | 2/2014 |
| JP | 2015231651 A | | 12/2015 |
| JP | 5871373 B2 | | 3/2016 |
| JP | 2016167724 A | | 9/2016 |
| JP | 2017084108 A | | 5/2017 |
| JP | 2018083259 A | | 5/2018 |
| JP | 6342974 B2 | | 6/2018 |
| JP | 6351745 B2 | | 7/2018 |
| JP | 6440385 B2 | | 12/2018 |
| JP | 2019-053439 A | | 4/2019 |
| JP | 2021045819 A | | 3/2021 |

* cited by examiner

CONTROL SYSTEM

TECHNICAL FIELD

The present disclosure relates to control systems.

BACKGROUND ART

In a known system in the related art, a machine tool and a robot work in cooperation with each other (for example, see Patent Literatures 1 and 2).

A known rotary-dial operating device is used for operating a robot manually during, for example, a teaching process (for example, see Patent Literatures 1 and 3). It is disclosed in Patent Literature 1 that the number of pulses generated corresponds to the amount of rotation of the dial, and a loader is moved by an amount corresponding to the number of pulses.

CITATION LIST

Patent Literature

PTL 1

PTL 2

Japanese Unexamined Patent Application, Publication No. 2001-154717

PTL 3

Publication of Japanese Patent No. 5871373

SUMMARY OF INVENTION

Technical Problem

In the system in which the machine tool and the robot work in cooperation with each other, a teaching process is normally performed on both the machine tool and the robot. If the machine tool and the robot are to be operated manually by using separate operating devices with different usage methods, the operator has to learn how to use two types of operating devices. Thus, it is desirable that both the machine tool and the robot can be operated by using the same operating device.

Solution to Problem

An aspect of the present disclosure provides a control system including: a manual operating device that has a dial to be rotated by an operator and that generates an operation signal in accordance with rotation of the dial; a machine tool controller that controls a machine tool based on the operation signal; a robot controller that is connected to the machine tool controller in such a manner as to be communicable therewith and that controls a robot based on the operation signal; and an operational-target setting unit that sets an operational target for the manual operating device selectively between the machine tool and the robot. The manual operating device is connected to one of the machine tool controller and the robot controller and inputs the operation signal to the one of the machine tool controller and the robot controller. When the operational-target setting unit sets the operational target as a control target to be controlled by the other of the machine tool controller and the robot controller, the one of the machine tool controller and the robot controller transmits the operation signal or a signal based on the operation signal to the other of the machine tool controller and the robot controller.

DESCRIPTION OF EMBODIMENTS

A control system 10 according to an embodiment will be described below with reference to the drawings.

Figure 1:
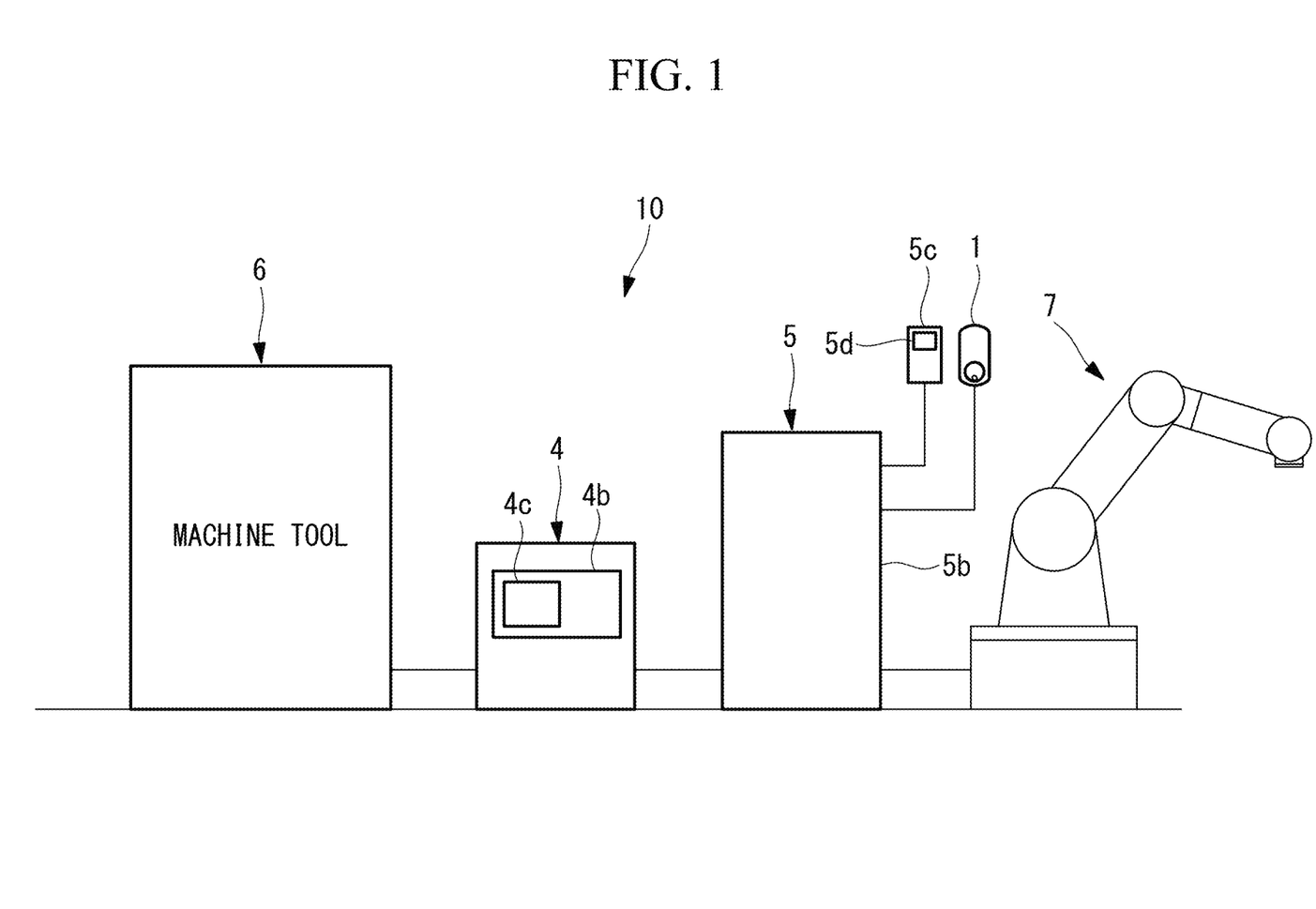
FIG. 1 illustrates the overall configuration of a system equipped with a machine tool, a robot, and a control system.

As shown in FIG. 1, the control system 10 controls a machine tool 6 and a robot 7 that operate in cooperation with each other.

Figure 2:
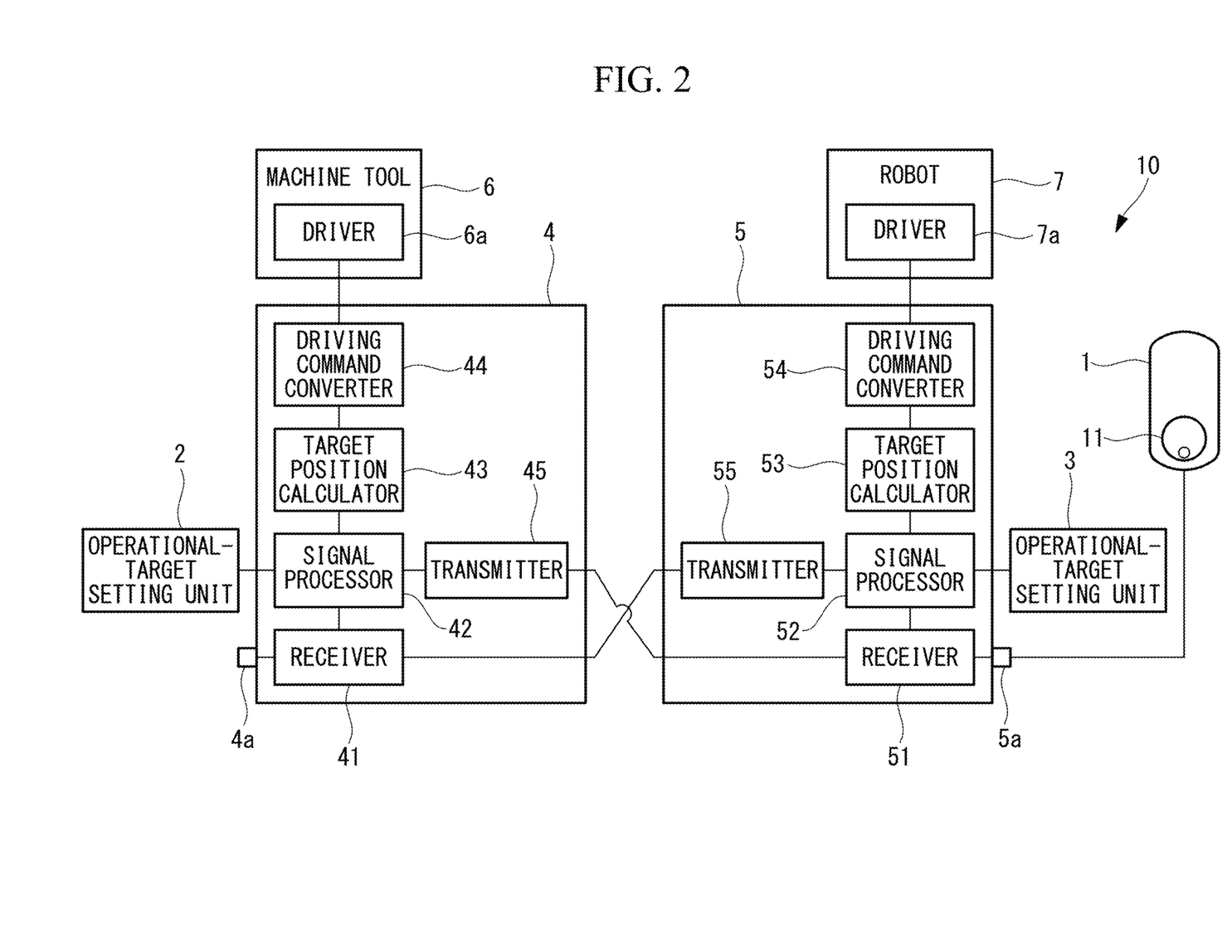
FIG. 2 is a block diagram of the control system in one usage example.

The machine tool 6 machines a workpiece by actuating a driver 6a (see FIG. 2). The driver 6a includes, for example, a rotation motor that rotates a tool and a feed motor that moves the tool and the workpiece relative to each other. The robot 7 is a vertical articulated robot that is disposed outside the machine tool 6 and that operates as a result of actuating a driver 7a (see FIG. 2). For example, the robot 7 feeds the workpiece to the machine tool 6 and retrieves the workpiece from the machine tool 6. The driver 7a includes, for example, servomotors provided at respective joints. The robot 7 may alternatively be a type of a robot other than a vertical articulated robot.

As shown in FIGS. 1 and 2, the control system 10 includes a portable manual operating device 1, operational-target setting units 2 and 3 that set an operational target for the manual operating device 1, a machine tool controller 4 that controls the machine tool 6, and a robot controller 5 that controls the robot 7.

The two controllers 4 and 5 are connected in such a manner as to be communicable with each other. For example, the two controllers 4 and 5 are connected to each other via a communication network, such as the Ethernet (registered trademark), and exchange signals with each other by using a communication protocol, such as FL-net.

The manual operating device 1 is a rotary-dial manual pulse generator for manually operating the machine tool 6 or the robot 7, serving as an operational target, via the controllers 4 and 5. The controllers 4 and 5 respectively have connectors 4a and 5a for the manual operating device 1, and the manual operating device 1 is connected to either one of the two controllers 4 and 5.

Figure 3:
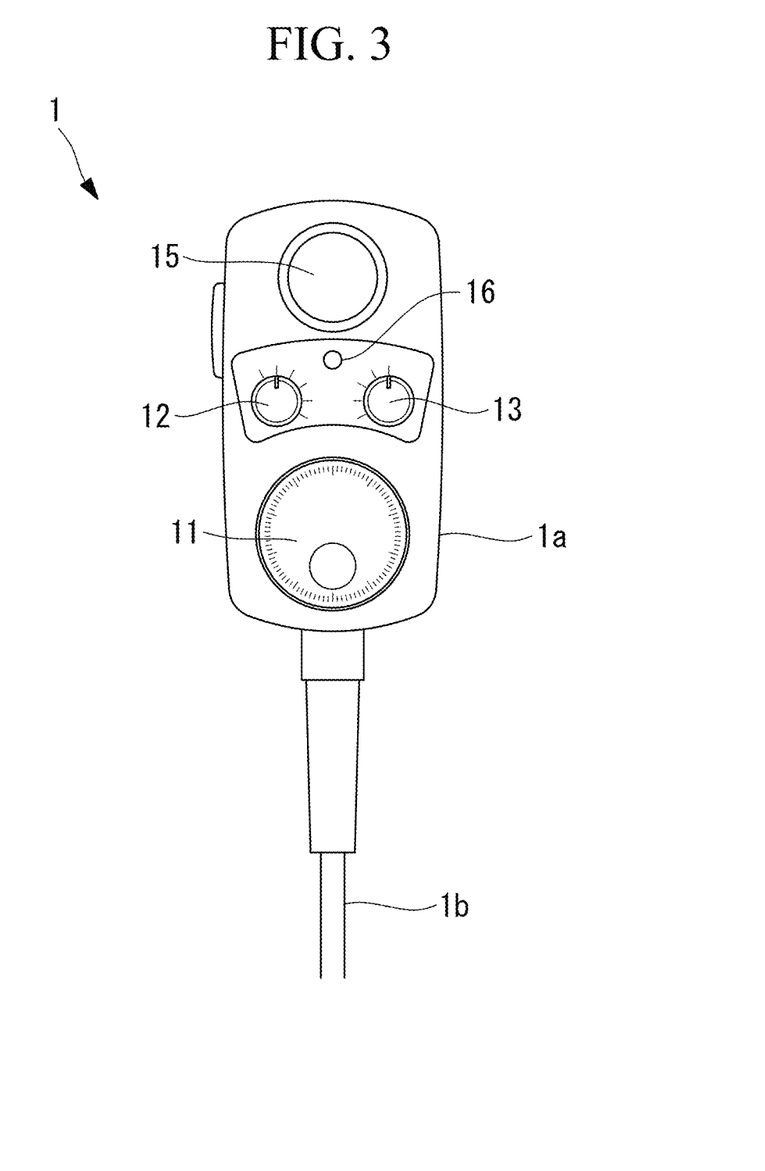
FIG. 3 is a front view of a manual operating device.
Figure 4:
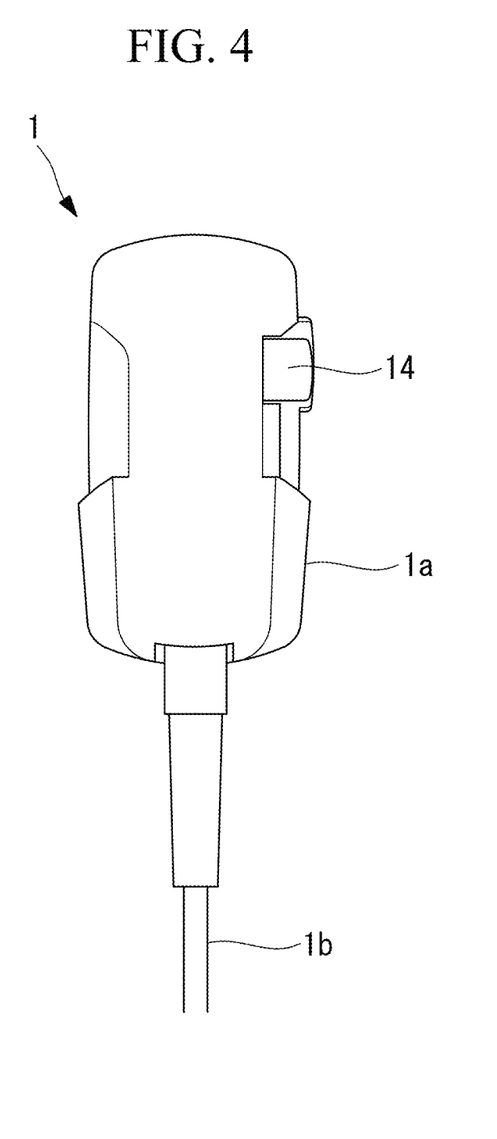
FIG. 4 is a rear view of the manual operating device.

As shown in FIGS. 3 and 4, the manual operating device 1 includes a housing 1a to be held manually by an operator and a cable 1b that connects the housing 1a to the connector 4a or 5a. Furthermore, the manual operating device 1 includes a pulse handle 11, a shaft selection switch 12, a multiplying-factor selection switch 13, an enable switch 14, and an emergency stop switch 15. The handle 11 and the switches 12, 13, 14, and 15 are provided on the housing 1a.

The pulse handle 11 is a rotary dial that is rotatable in opposite directions and that is to be rotationally operated by the operator, and is connected to a pulse generator (not shown) provided in the housing 1*a*. The pulse generator generates pulses in accordance with the amount and direction of rotation of the pulse handle 11, and the number of pulses to be generated increases with increasing amount of rotation. The movement of a predetermined operational section of the machine tool 6 or the robot 7 is controlled in accordance with the pulses, and the amount, speed, and direction of movement of the operational section are respectively designated in accordance with the amount, speed, and direction of rotation of the pulse handle 11. The operational section of the machine tool 6 is, for example, the distal end of a tool retained by a main shaft, and the operational section of the robot 7 is, for example, the distal end of a tool connected to the distal end of an arm.

The shaft selection switch 12 is used for switching the shaft for moving the operational section among a plurality of shafts. In one example, the shaft is switchable among a total of six shafts, namely, three linear shafts and three rotating shafts orthogonal thereto. The operational section moves in a direction extending along a selected linear shaft or rotates around a selected rotating shaft.

The multiplying-factor selection switch 13 is used for changing the multiplying factor of the amount of movement of the operational section per unit pulse. In one example, the multiplying factor is switchable among an OFF mode (i.e., a multiplying factor of 0), a multiplying factor of 1, a multiplying factor of 10, a multiplying factor of 100, and a multiplying factor of 1000. A pulse generated as a result of rotating the pulse handle 11 is multiplied by the multiplying factor set using the multiplying-factor selection switch 13. Therefore, the amount of movement of the operational section per unit amount of rotation of the pulse handle 11 increases with increasing multiplying factor. When the multiplying factor is set to the OFF mode, the operational target is not operable regardless of whether or not the pulse handle 11 is rotated.

The enable switch 14 is used for enabling or disabling the operation of the operational target using the manual operating device 1. The enable switch 14 is a push-button switch, such as a three-position switch, and is provided at a position where it is to be pressed with the hand holding the housing 1*a*. The operation of the operational target using the manual operating device 1 is enabled only when the enable switch 14 is pressed.

The emergency stop switch 15 generates an emergency stop signal for stopping the operational target when the emergency stop switch 15 is operated. The emergency stop signal is transmitted to the machine tool controller 4 or the robot controller 5 controlling the operational target. In response to the emergency stop signal, the machine tool controller 4 or the robot controller 5 stops moving the operational target.

The manual operating device 1 generates an operation signal containing the pulses generated as a result of rotation of the pulse handle 11 and signals indicating the statuses of the switches 12, 13, 14, and 15, and inputs the operation signal to the controller 4 or 5 connected to the manual operating device 1.

The operational-target setting units 2 and 3 are operated by the operator and set the operational target for the manual operating device 1 selectively between the machine tool 6 and the robot 7 in accordance with the operation by the operator. For example, each of the operational-target setting units 2 and 3 is a touch button displayed on a setting screen of an operator's panel of the controller 4 or 5 or is a hardware key provided on the operator's panel. If the robot controller 5 includes a portable operator's panel 5*c* connected to a controller body 5*b*, the operational-target setting unit 3 may be provided in the operator's panel 5*c*.

The operational-target setting units 2 and 3 may each be an external device, such as a sequencer (PLC: programmable logic controller) or a switch, connected to the controller 4 or 5, and a signal indicating the set operational target may be input to the controller 4 or 5 externally from the external device.

The operational target is to be set by either one of the two operational-target setting units 2 and 3, such that the operational target cannot be set simultaneously by both operational-target setting units 2 and 3. For example, when the manual operating device 1 is connected to the machine tool controller 4, only the operational-target setting unit 2 at the machine tool controller 4 side is functional, whereas when the manual operating device 1 is connected to the robot controller 5, only the operational-target setting unit 3 at the robot controller 5 side is functional. When the pulse handle 11 is being operated, the operational target is not changeable by the operational-target setting units 2 and 3.

As shown in FIG. 2, the machine tool controller 4 includes a receiver 41, a signal processor 42, a target position calculator 43, a driving command converter 44, and a transmitter 45. The machine tool controller 4 includes a processor and a storage device. The signal processor 42, the target position calculator 43, and the driving command converter 44 are realized by the processor.

The receiver 41 is connected to the connector 4*a* and receives the operation signal from the manual operating device 1 via the connector 4*a*.

The signal processor 42 is connected to the operational-target setting unit 2, the receiver 41, and the transmitter 45. The signal processor 42 forwards the operation signal received from the manual operating device 1 via the connector 4*a* to either one of the target position calculator 43 and the transmitter 45 in accordance with the operational target set by the operational-target setting unit 2. In detail, the signal processor 42 forwards the operation signal to the target position calculator 43 when the operational target is set to the machine tool 6, and forwards the operation signal to the transmitter 45 when the operational target is set to the robot 7. The transmitter 45 is connected to a receiver 51 of the robot controller 5 via the communication network, and transmits the forwarded operation signal to the receiver 51 in fixed cycles.

Furthermore, the signal processor 42 forwards the operation signal received from the robot controller 5 via the receiver 41 to the target position calculator 43.

The target position calculator 43 calculates a target position for the operational section of the machine tool 6 based on the operation signal. In detail, the amount of movement per unit pulse of the operational section of the machine tool 6 is set in advance for each shaft. The target position calculator 43 samples the number of pulses generated by the pulse generator at predetermined intervals, and multiplies the sampled number of pulses by the multiplying factor set using the multiplying-factor selection switch 13, thereby calculating the number of pulses. The target position calculator 43 calculates a target position corresponding to a case where the operational section is moved from the current position along the linear shaft or around the rotating shaft selected using the shaft selection switch 12 by the amount of movement corresponding to the calculated number of pulses.

The driving command converter 44 calculates a driving command signal for causing the driver 6a to move the operational section toward the target position based on the target position calculated by the target position calculator 43, and transmits the driving command signal to the driver 6a. The driver 6a is actuated in accordance with the driving command signal, so that the operational section moves toward the target position along the selected linear shaft or around the selected rotating shaft in accordance with the amount and direction of rotation of the pulse handle 11.

The robot controller 5 includes the receiver 51, a signal processor 52, a target position calculator 53, a driving command converter 54, and a transmitter 55. The robot controller 5 includes a processor and a memory. The signal processor 52, the target position calculator 53, and the driving command converter 54 are realized by the processor.

The receiver 51 is connected to the connector 5a and receives the operation signal from the manual operating device 1 via the connector 5a.

The signal processor 52 is connected to the operational-target setting unit 3, the receiver 51, and the transmitter 55. The signal processor 52 forwards the operation signal received from the manual operating device 1 via the connector 5a to either one of the target position calculator 53 and the transmitter 55 in accordance with the operational target set by the operational-target setting unit 3. In detail, the signal processor 52 forwards the operation signal to the target position calculator 53 when the operational target is set to the robot 7, and forwards the operation signal to the transmitter 55 when the operational target is set to the machine tool 6. The transmitter 55 is connected to the receiver 41 of the machine tool controller 4 via the communication network, and transmits the forwarded operation signal to the receiver 41 in fixed cycles.

Furthermore, the signal processor 52 forwards the operation signal received from the machine tool controller 4 via the receiver 51 to the target position calculator 53.

The target position calculator 53 calculates a target position for the operational section of the robot 7 based on the operation signal. In detail, the amount of movement per unit pulse of the operational section of the robot 7 is set in advance for each shaft. The target position calculator 53 samples the number of pulses generated by the pulse generator at predetermined intervals, and multiplies the sampled number of pulses by the multiplying factor set using the multiplying-factor selection switch 13, thereby calculating the number of pulses. The target position calculator 53 calculates a target position corresponding to a case where the operational section is moved from the current position along the linear shaft or around the rotating shaft selected using the shaft selection switch 12 by the amount of movement corresponding to the calculated number of pulses.

The driving command converter 54 calculates a driving command signal for causing the driver 7a to move the operational section toward the target position based on the target position calculated by the target position calculator 53, and transmits the driving command signal to the driver 7a. The driver 7a is actuated in accordance with the driving command signal, so that the operational section moves toward the target position along the selected linear shaft or around the selected rotating shaft in accordance with the amount and direction of rotation of the pulse handle 11.

Next, the operation of the control system 10 will be described.

The operator connects the manual operating device 1 to the robot controller 5 by connecting the cable 1b to the connector 5a.

When a jog operation of the robot 7 is to be performed manually, the operator operates the operational-target setting unit 3 to set the operational target to the robot 7, operates the switches 12 and 13 to select the desired multiplying factor and the desired shaft, and presses the enable switch 14 by using the hand that is holding the housing 1a. An operation signal indicating the selected operational target, the selected multiplying factor, the selected shaft, and the pressing of the enable switch 14 is transmitted from the manual operating device 1 to the robot controller 5.

Subsequently, the operator rotates the pulse handle 11 by a desired amount in a desired direction. An operation signal containing pulses generated as a result of the rotation of the pulse handle 11 is transmitted from the manual operating device 1 to the robot controller 5.

In the robot controller 5, the operation signal is input from the receiver 51 to the signal processor 52. Since the operational target is set to the robot 7 serving as a control target to be controlled by the robot controller 5, the operation signal is forwarded from the signal processor 52 to the target position calculator 53. Then, the target position calculator 53 calculates a target position for the operational section of the robot 7 based on the operation signal, and the driving command converter 54 calculates a driving command signal for moving the operational section of the robot 7 to the target position. The driving command signal is transmitted from the robot controller 5 to the driver 7a of the robot 7. The driver 7a is actuated in accordance with the driving command signal, so that the operational section of the robot 7 moves along the selected linear shaft to the target position or rotates around the selected rotating shaft to the target position.

When a jog operation of the machine tool 6 is to be performed manually, the operator operates the operational-target setting unit 3 to set the operational target to the machine tool 6. Subsequently, similar to the case of the jog operation of the robot 7, the operator operates the switches 12 and 13 to select the desired multiplying factor and the desired shaft, presses the enable switch 14, and rotates the pulse handle 11 by a desired amount in a desired direction. An operation signal indicating the selected operational target, the selected multiplying factor, the selected shaft, and the pressing of the enable switch 14 is transmitted from the manual operating device 1 to the robot controller 5, and an operation signal containing pulses is further transmitted from the manual operating device 1 to the robot controller 5.

In the robot controller 5, the operation signal is input from the receiver 51 to the signal processor 52. Since the operational target is set to the machine tool 6 serving as a control target to be controlled by the machine tool controller 4, the operation signal is forwarded from the signal processor 52 to the transmitter 55 and is transmitted from the transmitter 55 to the machine tool controller 4. In the machine tool controller 4, the operation signal is forwarded from the receiver 41 to the target position calculator 43 via the signal processor 42. Then, the target position calculator 43 calculates a target position for the operational section of the machine tool 6 based on the operation signal, and the driving command converter 44 calculates a driving command signal for moving the operational section of the machine tool 6 to the target position. The driving command signal is transmitted from the machine tool controller 4 to the driver 6a of the machine tool 6. The driver 6a is actuated in accordance with the driving command signal, so that the operational section of the machine tool 6 moves along the selected linear shaft to the target position or rotates around the selected rotating shaft to the target position.

Accordingly, in the control system 10, when the operational target is set to the robot 7, the robot controller 5 connected to the manual operating device 1 controls the robot 7 based on the operation signal input from the manual operating device 1. When the operational target is set to the machine tool 6, the robot controller 5 connected to the manual operating device 1 transmits the operation signal input from the manual operating device 1 to the machine tool controller 4, and the machine tool controller 4 controls the machine tool 6 based on the operation signal received from the robot controller 5. Accordingly, the jog operation of both the machine tool 6 and the robot 7 can be performed by using the single manual operating device 1 connected to the robot controller 5.

If a dedicated manual operating device is provided for the machine tool 6 and a dedicated manual operating device is provided for the robot 7, the operator needs to learn how to use both of the manual operating devices. In particular, it is burdensome for an operator experienced in handling the robot 7 to newly learn how to use the machine tool 6. Likewise, it is burdensome for an operator experienced in handling the machine tool 6 to newly learn how to use the robot 7. In this embodiment, the operator can easily learn the method of performing a jog operation of both the machine tool 6 and the robot 7 by simply learning how to use a single type of manual operating device 1.

As an alternative to this embodiment in which, when the operational target is set to the machine tool 6, the robot controller 5 transmits the operation signal input from the manual operating device 1 connected to the robot controller 5 to the machine tool controller 4, a signal based on the target position may be transmitted to the machine tool controller 4.

For example, the robot controller 5 may calculate the target position for the operational section of the machine tool 6 based on the operation signal, and may transmit the target position to the machine tool controller 4. Specifically, as shown in FIG. 5, the target position calculator 43 may be provided in the robot controller 5.

Figure 5:
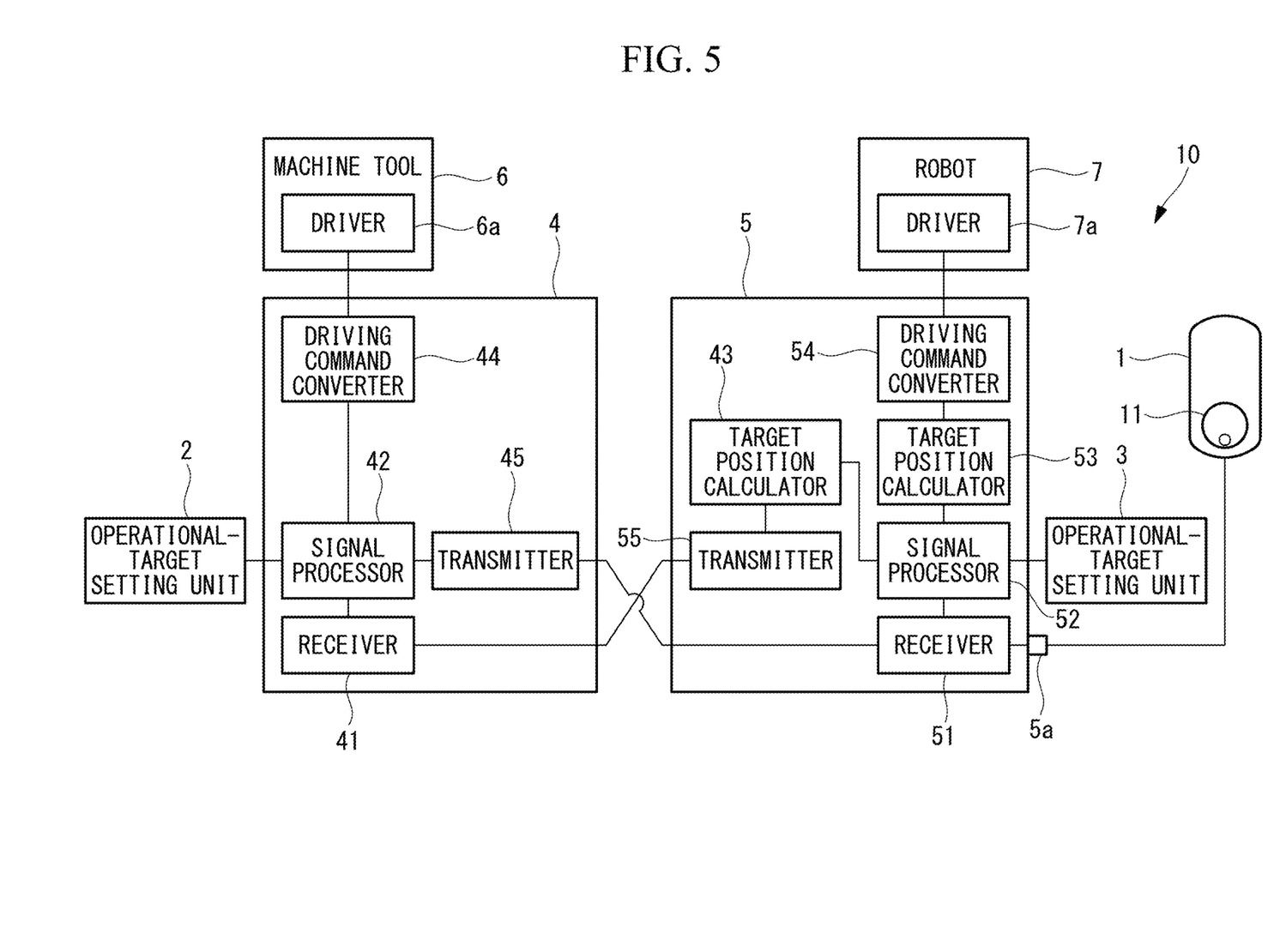
FIG. 5 is a block diagram of a modification of the control system.

In the configuration in FIG. 5, when the operational target is set to the machine tool 6, the signal processor 52 forwards the operation signal to the target position calculator 43, and the target position calculator 43 transmits information about the calculated target position for the operational section of the machine tool 6 to the transmitter 55. The information about the target position is transmitted from the transmitter 55 to the driving command converter 44 via the receiver 41 and the signal processor 42.

Figure 6:
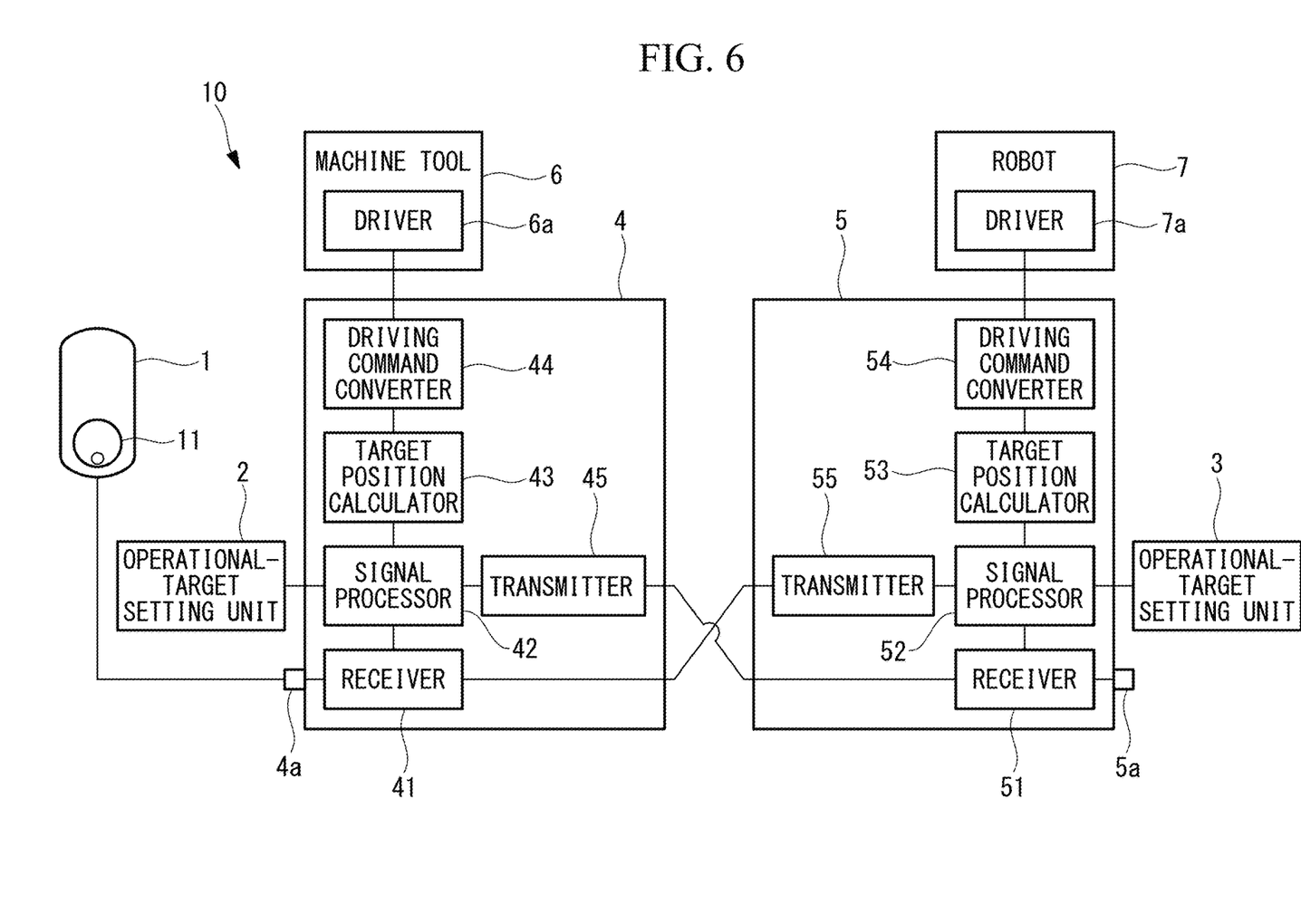
FIG. 6 is a block diagram of the control system in another usage example.

As an alternative to this embodiment in which the manual operating device 1 is connected to the robot controller 5, the manual operating device 1 may be connected to the machine tool controller 4 by connecting the cable 1b to the connector 4a, as shown in FIG. 6.

In the usage example in FIG. 6, if the operational target is set to the machine tool 6, an operation signal input from the manual operating device 1 to the signal processor 42 via the receiver 41 is forwarded from the signal processor 42 to the target position calculator 43, and the machine tool 6 is controlled based on the operation signal.

On the other hand, if the operational target is set to the robot 7, an operation signal input from the manual operating device 1 to the signal processor 42 via the receiver 41 is forwarded from the signal processor 42 to the transmitter 45 and is transmitted from the transmitter 45 to the robot controller 5. Then, in the robot controller 5, the operation signal is forwarded from the receiver 51 to the target position calculator 53 via the signal processor 52, and the robot 7 is controlled based on the operation signal.

As an alternative to the configuration in FIG. 6 in which, when the operational target is set to the robot 7, the machine tool controller 4 transmits the operation signal input from the manual operating device 1 connected to the machine tool controller 4 to the robot controller 5, the machine tool controller 4 may transmit a signal based on the target position to the robot controller 5.

For example, the machine tool controller 4 may calculate a target position for the operational section of the robot 7 based on the operation signal, and may transmit the target position to the robot controller 5. Specifically, as shown in FIG. 7, the target position calculator 53 may be provided in the machine tool controller 4.

Figure 7:
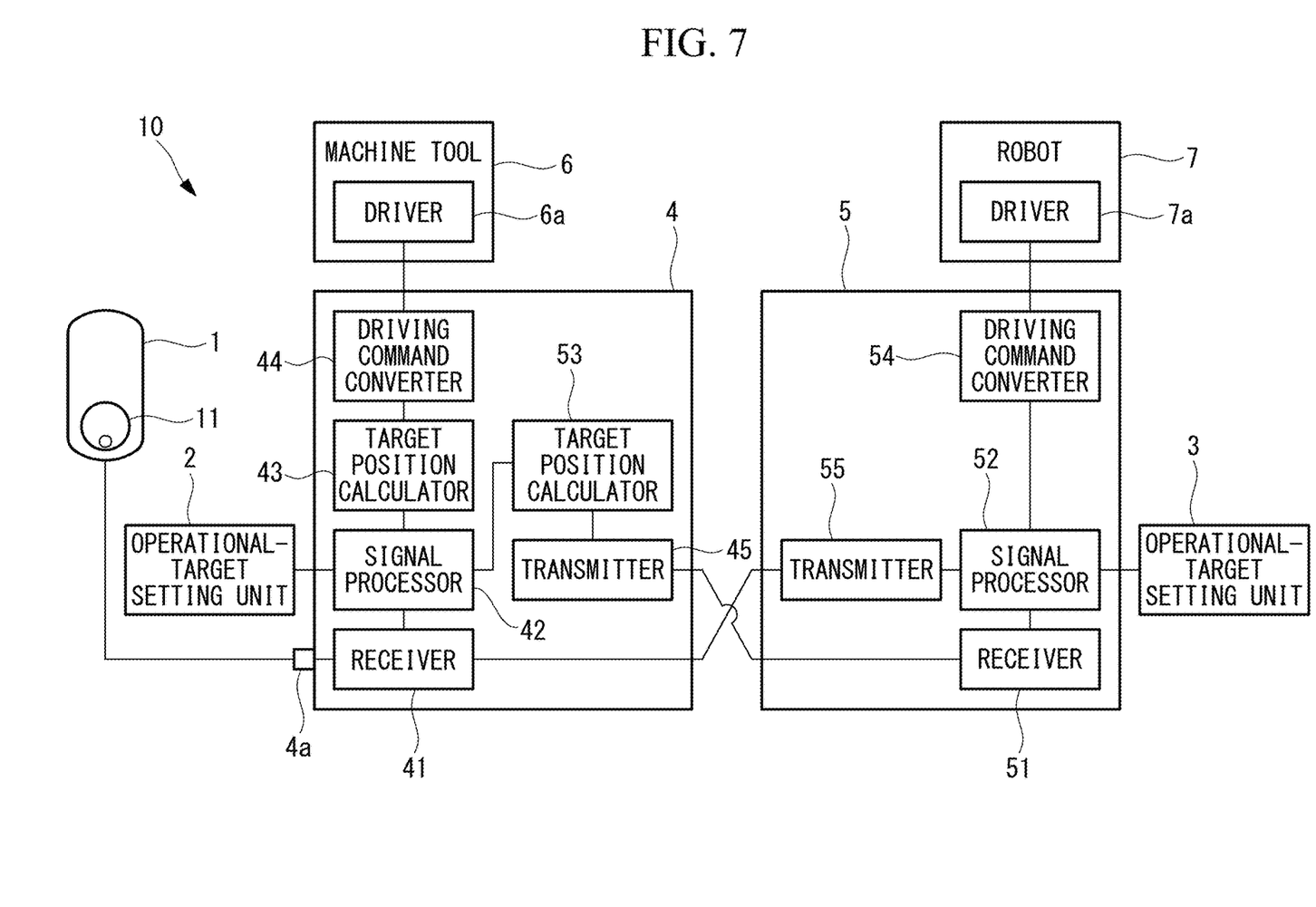
FIG. 7 is a block diagram of another modification of the control system.

In the configuration in FIG. 7, when the operational target is set to the robot 7, the signal processor 42 forwards the operation signal to the target position calculator 53, and the target position calculator 53 transmits information about the calculated target position for the operational section of the robot 7 to the transmitter 45. The information about the target position is transmitted from the transmitter 45 to the driving command converter 54 via the receiver 51 and the signal processor 52.

As an alternative to this embodiment in which the manual operating device 1 is connectable to the machine tool controller 4 and the robot controller 5, the manual operating device 1 may be connectable only to either one of the machine tool controller 4 and the robot controller 5.

Specifically, the machine tool controller 4 does not have to be provided with the connector 4a, as shown in FIG. 5, and the robot controller 5 does not have to be provided with the connector 5a, as shown in FIG. 7.

In this embodiment, the emergency stop switch 15 may be used for stopping the movement of not only the operational target but also both the machine tool 6 and the robot 7. For example, when the emergency stop switch 15 is operated, the emergency stop signal may be transmitted from the manual operating device 1 to both of the controllers 4 and 5.

As an alternative to this embodiment in which the operational-target setting units 2 and 3 are provided for the two controllers 4 and 5, respectively, the operational-target setting units 2 and 3 may be provided for either one of the controllers 4 and 5.

Furthermore, as an alternative to this embodiment in which the operational-target setting units 2 and 3 are provided outside the manual operating device 1, the operational-target setting units 2 and 3 may be provided in the manual operating device 1. For example, the operational-target setting units may be hardware keys provided on the housing 1a.

In this embodiment, when the operation of the operational target is enabled by using the enable switch 14, the controllers 4 and 5 may prohibit the machine tool 6 or the robot 7 not serving as the operational target from moving.

With this configuration, when the operator is operating the operational target, for example, a situation where another operator moves the machine tool 6 or the robot 7 not serving as the operational target can be prevented.

The portable operator's panel 5c for the robot 7 is also provided with an enable switch for switching the operation of the robot 7 between an enabled mode and a disabled mode using the portable operator's panel 5c. When the operational target is set to the machine tool 6, the robot controller 5 may stop the movement of the robot 7 regardless of whether or not the enable switch of the portable operator's panel 5c is pressed.

With this configuration, when the operator is operating the machine tool 6 by using the manual operating device 1, a situation where another operator operates and moves the robot 7 by using the portable operator's panel 5c can be prevented.

When the enable switch 14 is pressed, the robot controller 5 may prohibit the operation of the robot 7 by the portable operator's panel 5c regardless of whether or not the enable switch of the portable operator's panel 5c is pressed.

With this configuration, a situation where two operators respectively use the manual operating device 1 and the portable operator's panel 5c to simultaneously operate the robot 7 can be prevented.

In this configuration, an indicator indicating which one of the machine tool 6 and the robot 7 is set as the operational target may be provided. For example, the indicator is an LED lamp 16 (see FIG. 3) provided on the housing 1a and switches on or off or emits light in different colors depending on the operational target. Based on the on/off mode of the lamp 16 of the manual operating device 1 held in the operator's hand or the color of the light emitted from the lamp 16, the operator can confirm the current operational target.

In this embodiment, at least one of the machine tool controller 4 and the robot controller 5 may have a notifier that provides a notification about the operational target set by the operational-target setting unit 2 or 3 and about the shaft selected using the shaft selection switch 12. For example, the notifier includes a screen 4c (see FIG. 1) of a operator's panel 4b of the machine tool controller 4 and a screen 5d (see FIG. 1) of the portable operator's panel 5c, and graphically displays the operational target and the selected shaft.

The operator holding the manual operating device 1 and another operator can confirm the current operational target and the selected shaft based on the notification provided by the notifier.

In this embodiment, at least one of the controllers 4 and 5 may have a function for simulating the movement of the operational target based on the operation signal. In this case, the controller 4 or 5 executes a simulation before the operational target moves based on the operation signal, and stops the movement of the operational target based on the operation signal in a case where interference between the machine tool 6 and the robot 7 is predicted from the simulation. Accordingly, interference between the machine tool 6 and the robot 7 can be prevented.

For example, the storage device of each of the controllers 4 and 5 stores three-dimensional models and three-dimensional positions of the machine tool 6 and the robot 7. The controller 4 or 5 connected to the manual operating device 1 arranges the three-dimensional models of the machine tool 6 and the robot 7 in a three-dimensional virtual space based on the three-dimensional positions stored in the storage device, moves the operational sections of the three-dimensional models serving as operational targets to target positions in the virtual space, and determines whether or not the three-dimensional model of the machine tool 6 and the three-dimensional model of the robot 7 interfere with each other. These processes are executed by the processor of the controller 4 or 5.

REFERENCE SIGNS LIST

1 manual operating device
2, 3 operational-target setting unit
4 machine tool controller
5 robot controller
4c, 5d notifier
6 machine tool
7 robot
10 control system
11 pulse handle (dial)
14 enable switch
15 emergency stop switch
16 indicator

The invention claimed is:

1. A control system comprising:
a machine tool controller that controls a machine tool;
a robot controller that is connected to the machine tool controller in such a manner as to be communicable therewith and that controls a robot;
a manual operating device that has a dial to be rotated by an operator and that generates, in response to rotation of the dial, an operation signal for moving the machine tool and the robot; and
an operational-target setting unit that sets an operational target for the manual operating device selectively between the machine tool and the robot,
wherein the manual operating device is connected to one of the machine tool controller and the robot controller and inputs the operation signal to the one of the machine tool controller and the robot controller, and
wherein, when the operational-target setting unit sets the operational target as a control target to be controlled by the other of the machine tool controller and the robot controller, the one of the machine tool controller and the robot controller transmits the operation signal or a signal based on the operation signal to the other of the machine tool controller and the robot controller.

2. The control system according to claim 1,
wherein the robot controller transmits the operation signal input from the manual operating device connected to the robot controller to the machine tool controller, and
wherein the machine tool controller calculates a target position for the machine tool based on the operation signal received from the robot controller, and moves the machine tool to the target position.

3. The control system according to claim 1,
wherein the robot controller calculates a target position for the machine tool based on the operation signal input from the manual operating device connected to the robot controller, and transmits the target position to the machine tool controller, and
wherein the machine tool controller moves the machine tool to the target position received from the robot controller.

4. The control system according to claim 1,
wherein the machine tool controller transmits the operation signal input from the manual operating device connected to the machine tool controller to the robot controller, and
wherein the robot controller calculates a target position for the robot based on the operation signal received from the machine tool controller, and moves the robot to the target position.

5. The control system according to claim 1,
wherein the machine tool controller calculates a target position for the robot based on the operation signal input from the manual operating device connected to the machine tool controller, and transmits the target position to the robot controller, and
wherein the robot controller moves the robot to the target position received from the machine tool controller.

6. The control system according to claim 1,
wherein the manual operating device has an emergency stop switch for stopping movement of both the machine tool and the robot.

7. The control system according to claim 1,
wherein the operational-target setting unit is provided in the manual operating device or outside the manual operating device.

8. The control system according to claim 7,
wherein the operational-target setting unit is provided in at least one of an operator's panel of the machine tool controller and an operator's panel of the robot controller.

9. The control system according to claim 1,
wherein the manual operating device includes an enable switch for switching an operation of the operational target for the manual operating device between an enabled mode and a disabled mode, and
wherein, when the operation of the operational target is switched to the enabled mode by using the enable switch, the machine tool controller and the robot controller prohibit the machine tool or the robot not serving as the operational target from moving.

10. The control system according to claim 1,
wherein the manual operating device has an indicator that indicates the operational target set by the operational-target setting unit.

11. The control system according to claim 1,
wherein at least one of the machine tool controller and the robot controller has a notifier that notifies the operator about the operational target set by the operational-target setting unit.

12. The control system according to claim 1,
wherein at least one of the machine tool controller and the robot controller simulates movement of the operational target based on the operation signal and stops the movement of the operational target based on the operation signal in a case where interference between the machine tool and the robot is predicted.

* * * * *